US011940824B2

(12) United States Patent
Liu et al.

(10) Patent No.: US 11,940,824 B2
(45) Date of Patent: Mar. 26, 2024

(54) TECHNIQUES IN HYBRID REGULATORS OF HIGH POWER SUPPLY REJECTION RATIO AND CONVERSION EFFICIENCY

(71) Applicant: Intel Corporation, Santa Clara, CA (US)

(72) Inventors: Xiaosen Liu, Portland, OR (US); Harish Krishnamurthy, Beaverton, OR (US); Krishnan Ravichandran, Saratoga, CA (US); Vivek De, Beaverton, OR (US); Scott Chiu, Folsom, CA (US); Claudia Patricia Barrera Gonzalez, Campbell, CA (US); Jing Han, Mountain View, CA (US); Rajasekhara Madhusudan Narayana Bhatla, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 485 days.

(21) Appl. No.: 17/100,603

(22) Filed: Nov. 20, 2020

(65) Prior Publication Data

US 2021/0103308 A1 Apr. 8, 2021

Related U.S. Application Data

(62) Division of application No. 16/450,873, filed on Jun. 24, 2019, now Pat. No. 10,845,831.

(51) Int. Cl.

*G05F 1/56* (2006.01)
*G05F 1/46* (2006.01)
*G05F 1/67* (2006.01)

(52) U.S. Cl.

CPC ................ *G05F 1/56* (2013.01); *G05F 1/462* (2013.01); *G05F 1/67* (2013.01)

(58) Field of Classification Search

CPC ............... G05F 1/462; G05F 1/56; G05F 1/67
See application file for complete search history.

(56) References Cited

U.S. PATENT DOCUMENTS 9,870,014 B1 1/2018 Ham et al.
10,198,015 B1 2/2019 Ham et al.
(Continued)

FOREIGN PATENT DOCUMENTS

KR 10-2012-0098025 A 9/2012
WO 2015047276 A1 4/2015

OTHER PUBLICATIONS

Cheah et al., A 100-mA, 99.11% Current Efficiency, 2-mVpp Ripple Digitally Controlled LDO With Active Ripple Suppression, Feb. 2017, IEEE, Trans. VLSI Systems, vol. 25, 696-704 (Year: 2017).*
(Continued)

*Primary Examiner* — Jue Zhang
(74) *Attorney, Agent, or Firm* — Schwabe, Williamson & Wyatt, P.C.

(57) ABSTRACT

Embodiments of the present disclosure describe methods, apparatuses, and systems for hybrid low dropout regulator (LDO) architecture and realization to provide high power supply rejection ratio (PSRR) and high conversion efficiency (CE), and other benefits. The hybrid LDO may be coupled with dual rails for its analog LDO branch and digital LDO respectively to achieve high PSRR and high CE by utilizing the hybrid architecture with several feedback loops. Other embodiments may be described and claimed.

20 Claims, 7 Drawing Sheets

(56) References Cited

U.S. PATENT DOCUMENTS

| | | | |
|---|---|---|---|
| 10,203,709 | B1 | 2/2019 | Feng et al. |
| 2016/0349774 | A1 | 12/2016 | Easwaran et al. |
| 2019/0317536 | A1 | 10/2019 | Liu et al. |

OTHER PUBLICATIONS

Tang et al.,Analog-Assisted Digital Capacitorless Low-Dropout Regulator Supporting Wide Load Range, Mar. 2019, IEEE, Trans. Industrial Electronics, vol. 66, 1799-1807.*

Mohammad Al-Shyoukh et al., "A Transient-Enhanced Low-Quiescent Current Low-Dropout Regulator With Buffer Impedance Attenuation," IEEE Journal of Solid-State Circuits, vol. 42, Issue 8, Aug. 2007, 11 pages.

M. El-Nozahi et al., "High PSR Low Drop-Out Regulator With Feed-Forward Ripple Cancellation Technique," IEEE Journal of Solid-State Circuits, vol. 45, Issue 3, Mar. 2010, 13 pages.

Y. Lee et al., "A 200mA Digital Low-Drop-Out Regulator with Coarse-Fine Dual Loop in Mobile Application Processors," IEEE Journal of Solid-State Circuits, vol. 52, Issue 1, Jan. 2017, 3 pages.

Loai G. Salem, "20.3 A 100nA-to-2mA successive-approximation digital LDO with PD compensation and sub-LSB duty control achieving a 15.1ns response time at 0.5V," 2017 IEEE International Solid-State Circuits Conference (ISSCC), Feb. 5-9, 2017, 3 pages.

X. Ma et al., "A 0.4V 430nA quiescent current NMOS digital LDO with NAND-based analog-assisted loop in 28nm CMOS," 2018 IEEE International Solid—State Circuits Conference—(ISSCC), Feb. 11-15, 2018, 3 pages.

P. Hazucha et al., "Area-efficient linear regulator with ultra-fast load regulation," IEEE Journal of Solid-State Circuits, vol. 40, Issue 4, Apr. 2005, 8 pages.

International Search Report and Written Opinion dated Jul. 21, 2020 for International Application No. PCT/US2020/024714, 10 pages.

Saad Bin Nasir et al. "A 130nm hybrid low dropout regulator based on switched mode control for digital load circuits" ESSCIRC Conference 2016: 42nd European Solid-State Circuits Conference. pp. 317-320.

Saad Bin Nasir et al. "Embedded hybrid LDO topologies for digital load circuits" 2016 IEEE Asia Pacific Conference on Circuits and Systems (APCCAS). pp. 43-46. DOI: 10.1109/APCCAS.2016.7803891. 2016 pp. 43-46.

Ex Parte Quayle Action issued Apr. 28, 2020 for U.S. Appl. No. 16/450,873, 10 pages.

Notice of Allowance dated Aug. 4, 2020 for U.S. Appl. No. 16/450,873, 5 pages.

Notice of Allowance dated Oct. 22, 2020 for U.S. Appl. No. 16/450,873, 6 pages.

* cited by examiner

TECHNIQUES IN HYBRID REGULATORS OF HIGH POWER SUPPLY REJECTION RATIO AND CONVERSION EFFICIENCY

CROSS REFERENCE TO RELATED APPLICATION

The present application is a divisional of U.S. patent application Ser. No. 16/450,873, filed Jun. 24, 2019, entitled "TECHNIQUES IN HYBRID REGULATORS OF HIGH POWER SUPPLY REJECTION RATIO AND CONVERSION EFFICIENCY," the entire disclosure of which is hereby incorporated by reference in its entirety.

FIELD

Embodiments of the present invention relate generally to the technical fields of low dropout regulator (LDO) architecture and realization with respect to, including but not limited to, power supply rejection ratio (PSRR), conversion efficiency, and other considerations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Advances in semi-conductor circuit design and processing have significantly increased the amount of logic and analog circuitry that may be present on an integrated circuit (IC) device. Advanced IC devices have been implemented significantly in power management on various systems, for example, system-on-chip (SOC), system-in-package (SIP), etc. Analog LDOs usually provide great PSRR and are used in noise sensitive applications, such as phase-lock loops, high-speed input/output (I/O), and wireless transceivers. Meanwhile, digital LDOs can provide high conversion efficiency but much less PSRR. With increasing demand for high efficiency LDOs in mobile devices of critical battery life requirement, high PSRR is also a critical requirement in providing low noise power supply to various devices in a system.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
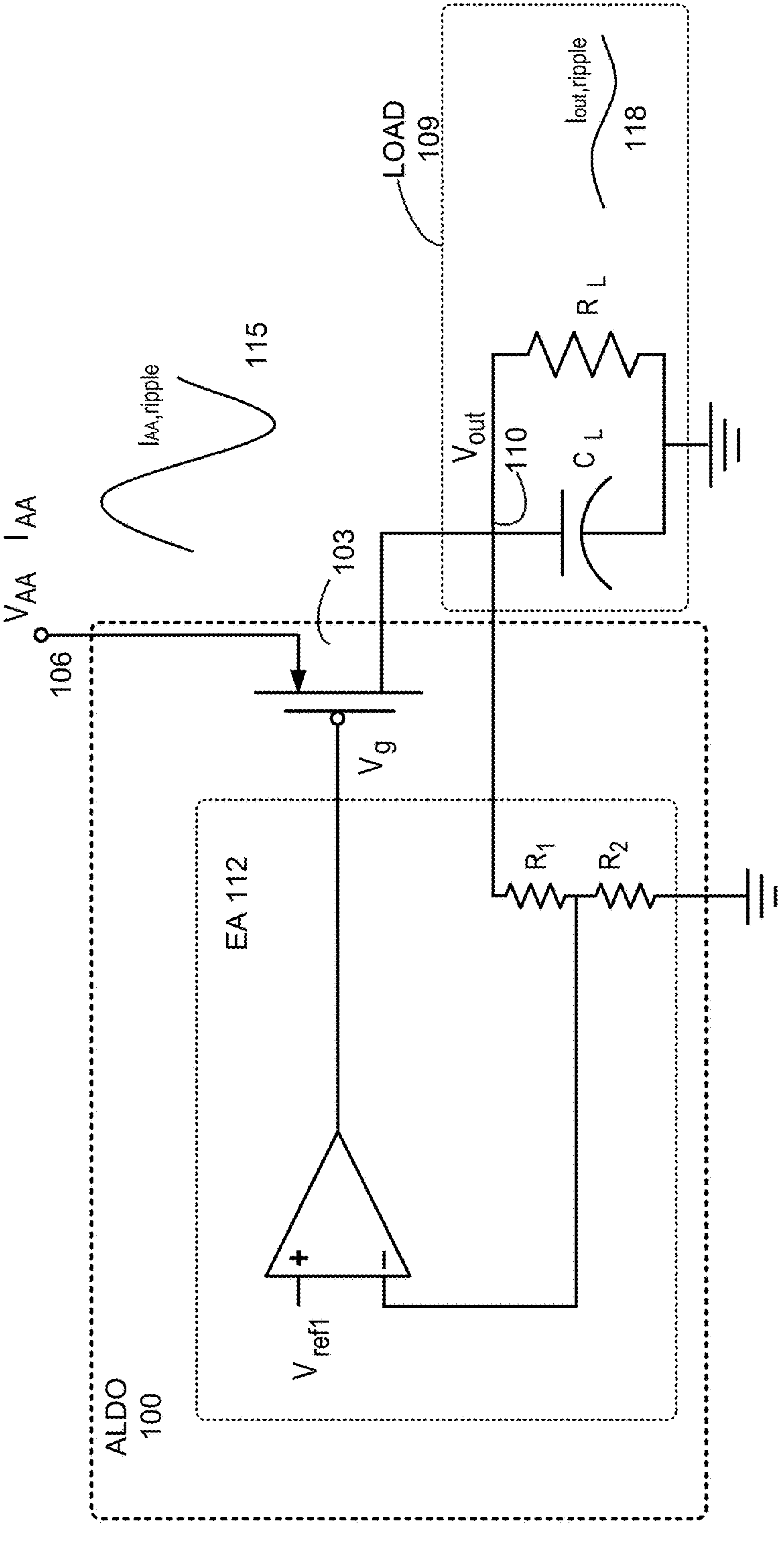
FIG. 1 illustrates an example schematic topology of a simplified analog LDO in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, power management, SOC, SIP, processors, central processing unit (CPU), graphics processing unit (GPU), processors on chip (POC), memory, or input/output (IO) port that provides the described functionality. In some embodiments, the circuitry may execute one or more software or firmware modules or programs to provide the described functions. In some embodiments, circuitry may include logic, at least partially operable in hardware. "Circuitry," "components," and "devices" may be used interchangeably herein.

Advances in semi-conductor circuit design and processing have significantly increased desire for power management units that may be present on an integrated circuit (IC) device. An LDO is part of a power management unit and is usually placed between an input power source (rail) and a load in order to provide a controlled voltage to supply power to the load. As used herein, the term "IC" may refer to, be part of, or include any combination of a power management unit, SOC, SIP, or other circuitry performing power management in a system. Further details are to be discussed in later paragraphs.

Note that in various drawings corresponding to the embodiments herein, signals are represented with lines. Some lines have arrows at one or more ends, to indicate information flow direction by control signals. Such indications are not intended to be limiting. Rather, the lines are used in connection with one or more exemplary embodiments to facilitate easier understanding of circuitry or a logical unit. Any represented signals, as indicated by design needs or preferences, may include one or more signals that may travel in either direction and may be implemented with any suitable type of signal scheme.

Throughout the specification, and in the claims, the term "connected" means a direct connection, such as an electrical, mechanical, or magnetic connection between components and/or devices, without any intermediary components or devices. The term "coupled" means a direct or indirect connection, such as an electrical, mechanical, or magnetic connection between components or devices, via one or more passive and/or active intermediary components or devices. An "a," "an," or "the" may include plural references. The meaning of "in" includes "in" and "on."

The terms "substantially," "close," "approximately," "near," and "about" generally refer to being within +/−10% of a target value (unless specifically specified). Unless otherwise specified, the use of the ordinal adjectives "first," "second," and "third," etc., to describe a common object merely indicate that different instances of like objects are being referred to, and are not intended to imply that the objects so described must be in a given sequence, either temporally, spatially, in ranking, or in any other manner.

For purposes of the embodiments, the transistors in various circuits and logic blocks herein are metal oxide semiconductors (MOS) transistors or their derivatives, where the MOS transistors include drain, source, gate, and bulk terminals. The transistors and/or MOS transistor derivatives may include Tri-Gate transistors and Fin field effect transistors (FinFETs), gate-all-around cylindrical transistors, tunnel FET (TFET), square wire, or rectangular ribbon transistors, ferroelectric FET (FeFET), or other devices implementing transistor functionality like carbon nanotubes or spintronic devices. MOSFET symmetrical source and drain terminals are identical terminals and are interchangeably used here. A TFET device, on the other hand, has asymmetric source and drain terminals. Other transistors, for example, Bi-polar junction transistors BJT PNP/NPN, complementary MOS (CMOS), Bi-CMOS (BiCMOS), etc., may be used without departing from the scope of the disclosure. For the purpose of simplicity of the disclosure, only MOS, CMOS, p-type MOS (PMOS), and n-type MOS (NMOS) are described in the specification.

Conventional analog LDOs of linear regulations may provide great PSRR and may be used for noise sensitive applications, such as a phase-lock loop, high-speed input/output (I/O), wireless transceiver. But analog LDOs may not have desirable conversion efficiency (CE) due to a relatively high dropout voltage. Meanwhile, digital LDOs can provide high conversion efficiency but sacrifices on PSRR. With increasing demand for high efficiency LDOs in mobile devices of critical battery life requirement, high PSRR is also a critical requirement in providing low noise power supply to various devices in a system.

FIG. 1 illustrates an example schematic topology of a simplified analog LDO 100 (hereinafter "analog LDO 100") in accordance with various embodiments. The analog LDO 100 may be an IC or the like. The analog LDO 100 may include a set of analog devices, and the terms "analog LDO" and "set of analog devices" may be used interchangeably in this disclosure. The analog LDO 100 may include a power PMOS 103 that is coupled to a rail 106, which may provide an input source to the LDO. The source may have a voltage $V_{AA}$ and current $I_{AA}$. The power PMOS 103 is used in this example illustration, but one or more transistors of PMOS or other types of transistors (e.g., NMOS) may be used for the analog LDO 100. The analog LDO 100 may have open collector or drain coupled to a load 109. The analog LDO 100 may include an error amplifier (EA) 112 that may be used to control the PMOS 103 via a gate voltage $V_g$. An output power of voltage $V_{out}$ may be provided to the load 109 at an output node 110. The analog LDO 100 may act as a variable resistor that is placed between an input power source (the rail 106) and the load 109 so as to drop and control the voltage applied to the load 109. The analog LDO 100 may have great PSRR capability, which is an ability of an LDO to maintain its output voltage ($V_{out}$ in FIG. 1) while its direct current (DC) power-supply ($V_{AA}$ in FIG. 1) is varied. $V_{AA}$ and/or $I_{AA}$ may have a ripple fluctuation 115 introduced by the input source, which is also referred to as a noise in the input source. The analog LDO 100 may suppress this ripple to provide less ripple fluctuation 118 at the output voltage and/or current feeding into the load 109.

There are some drawbacks of the analog LDO 100 to achieve high PSRR. One of them is conversion efficiency (CE), which can be measured as voltage conversion efficiency (VCE), current conversion efficiency (CCE), or power conversion efficiency (PCE). The VCE is measured as a ratio between the output voltage $V_{out}$ and the input voltage $V_{AA}$, in the example of FIG. 1. Usually a $V_{AA}$ needs to be sufficiently larger than $V_{out}$ to effectively achieve a desired PSRR. Moreover, a better PSRR may result in lower VCE when other conditions of the LDO are unchanged. In addition, the analog LDO 100 may need to ensure output voltage and/or current stability over a wide and dynamic load range. When the load 109 is smaller than a typical load size as designed, output current stability may be more difficult to achieve and a leaker may be used to ensure a minimum load for the implementation. However, this may result an undesired low CCE. For example, if the analog LDO 100 is designed to support a dynamic load current from 0 to 70 mA, a 6 mA may be required to ensure the stability. Thus, when the analog LDO is implemented to power a phase-lock loop (PLL) with a driving current of 1.5 mA, the corresponding CCE is only 20%, estimated with that 1.5/(1.5+6)=20%. Therefore, a conventional analog LDO 100 may have poor power conversion efficiency (PCE=VCE×CCE), as low as 5 to 50%.

Figure 2:
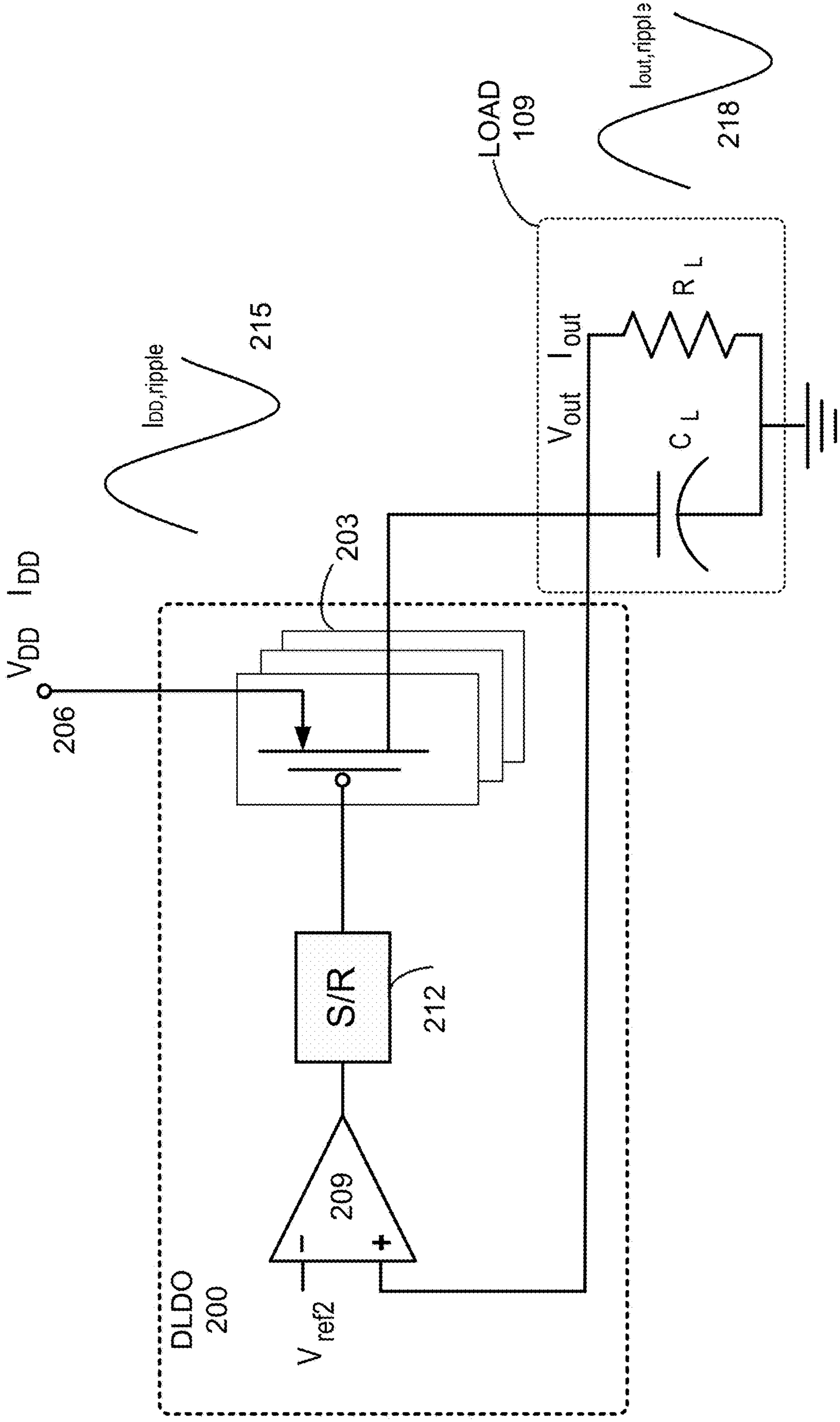
FIG. 2 illustrates an example schematic topology of a simplified digital LDO in accordance with various embodiments.

FIG. 2 illustrates an example schematic topology of a simplified digital LDO 200 (hereinafter "digital LDO 200") in accordance with various embodiments. The digital LDO 200 may be an IC or the like. The digital LDO 200 may include a set of digital devices, and the terms "digital LDO" and "set of digital devices" may be used interchangeably in this disclosure. The digital LDO 200 may include an array of switch transistors 203 that are coupled to a rail 206, which may be used to provide an input source to the LDO. The input source may have a voltage $V_{DD}$ and current $I_{DD}$. Each of the array of transistors 203 may be a p-type MOSFET or PMOS, or other types of transistors. The digital LDO 200 may have open collector or drain coupled to the load 109.

The digital LDO 200 may include a comparator 209 to control a serial-in parallel-out bidirectional shift register (S/R) 212, or any other generic digital LDO controllers. The S/R 212 may then switch on and off to control each of the power PMOS of the array, in order to provide desired load voltage $V_{out}$ and current $I_{out}$. The comparator 209 may be used to detect the difference between the output voltage $V_{out}$ and the reference voltage $V_{ref2}$ and signal the S/R 212 to minimize the loop steady-state error by adjusting on/off of one or more power PMOSs. One of the benefits of the digital LDO 200 is that it can operate at relatively small dropouts, which is the difference between the voltage level of the input source $V_{DD}$ and $V_{out}$. For example, a dropout voltage of 10 mV may be sufficient to provide stable current supply without a leaker current. This may achieve a near 100% CCE. In general, overall PCE of the digital LDO 200 may be higher than 90% typically. However, the digital LDO 200 may have poor PSRR, since each power transistor of the array of the transistors may operate as a switch and not be able to provide noise rejection as the analog LDO can do.

In addition, the digital LDO may further self-introduce high frequency noise due to a switching nature when using the transistors in their switch mode. Thus, a ripple fluctuation 215 introduced by the input source 206 may not be suppressed by the digital LDO 200, which may result in an undesirable ripple fluctuation 218 in $V_{out}$. The ripple fluctuation 218 may further include the self-introduced high-frequency noise caused by the digital LDO 200.

In some embodiments, the digital LDO 200 may further include one or more analog LDOs that are coupled with the digital LDO 200 in parallel and share the same power source rail to achieve better PSRR.

Figure 3B:
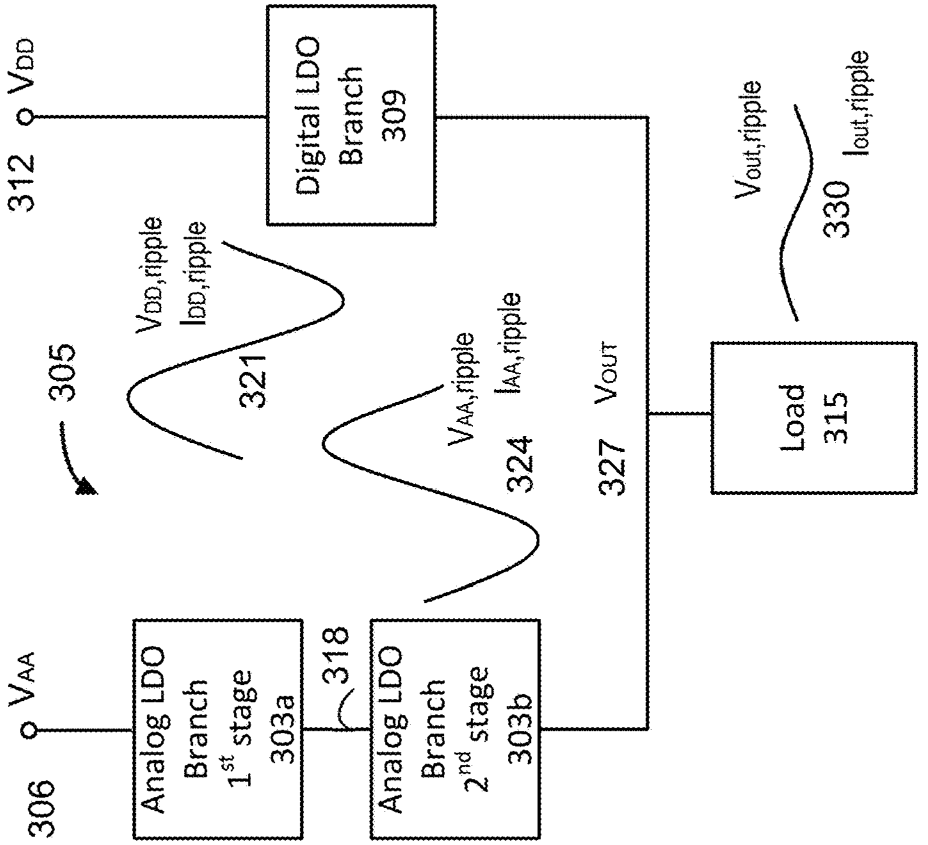
FIG. 3B illustrates an example diagram of a hybrid LDO with more than one stage of analog LDO in accordance with some embodiments.
Figure 3A:
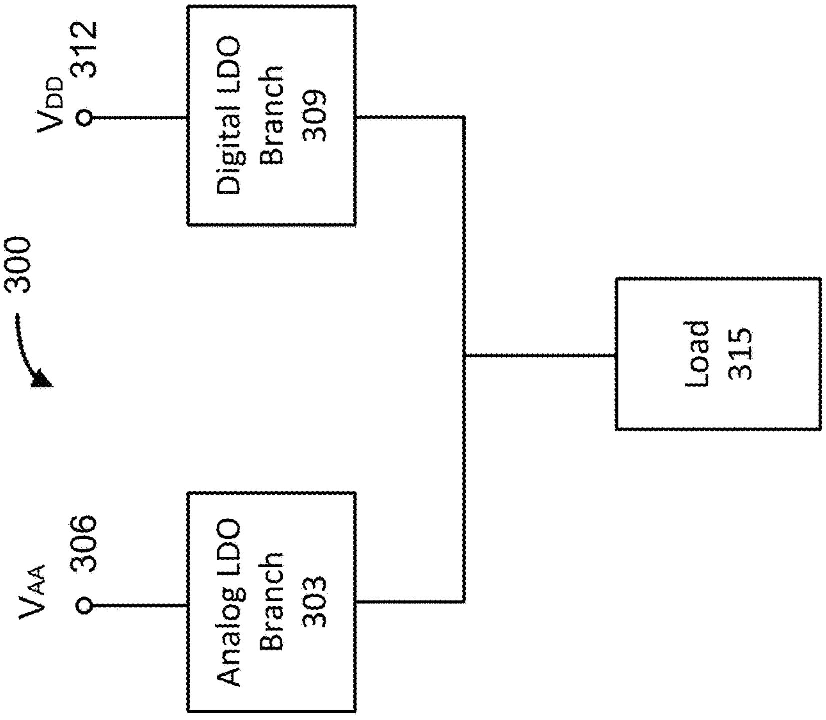
FIG. 3A illustrates an example diagram of a hybrid LDO architecture in accordance with some embodiments.

FIG. 3A illustrates an example diagram of a hybrid LDO architecture 300 (hereinafter "hybrid LDO 300") in accordance with various embodiments. The hybrid LDO 300 may achieve high PSRR with good PCE by utilizing the benefits of both the analog LDO 100 and digital LDO 200. The hybrid LDO 300 may include at least one analog LDO, one digital LDO, a digital regulator, and several feedback loops.

In some embodiments, the principle may be to use the digital LDO for providing a large portion of a desired load current because of the high PCE characteristic of the digital LDO, and use the analog LDO for suppressing noise because of the high PSRR characteristic of the analog LDO. The analog LDO may further provide a relatively small portion of current to the load. A ratio of the current from the analog LDO to the current from the digital LDO may indicate a tradeoff between PSRR and PCE. The hybrid LDO 300 may include an analog LDO branch 303, which is coupled to or connected with a first rail 306. The first rail 306 may provide power to the analog LDO branch 303.

The hybrid LDO 300 may also include a digital LDO branch 309, which is coupled to or connected with a second rail 312. The second rail 312 may provide power to the digital LDO branch 309. The analog LDO branch 303 may include one or more analog LDOs, which are the same as or substantially similar to the analog LDO 100. The digital LDO branch 309 may be the same as or substantially similar to the digital LDO 200. The analog LDO branch 303 and the digital LDO branch 309 may be coupled respectively to a load and provide power to the load 315 jointly. The first rail 306 and the second rail 312 may be two independent rails with the same or different voltage values, and they may not be electronically connected. The load 315 may require a stable load voltage and current to provide power to the load 315. The voltage provided by the first rail 306 may be in a range that can provide a sufficient dropout voltage to satisfy the PSRR requirement specified by the load application. For example, a 1.3 volt (V) input voltage may be sufficient to provide a 1.3V-to-1V down-conversion to provide the load 315 with a current supply with satisfaction of the specified PSRR, depending on the realization of the analog and digital LDO design. If the analog LDO branch 303 provides power to the load 315, the corresponding PCE may be determined by the associated dropout voltage, in which PCE=$1/1.3$=76.92%, assuming the required load voltage is 1V. This PCE value may be the lower bound of the PCE with respect to the hybrid LDO 300.

FIG. 3B illustrates an example diagram of a hybrid LDO 305 with more than one stage of analog LDO in accordance with some embodiments. In FIG. 3B, the analog LDO branch has a first stage 303*a* and a second stage 303*b*. Each stage has an analog LDO that is the same as or substantially similar to the analog LDO 100. When a relatively high voltage of the first rail 306 is used to provide power to the load 315, more than one analog LDO may be used if the voltage of the first rail 306 is high. For example, if the first rail 306 has a voltage $V_{AA}$ of 1.8V, two stages of analog LDO branch 303*a/b* may be used. In this example, the first stage analog branch may down-convert the 1.8V voltage to 1.3V, which feeds into the second stage 303*b* at node 318. The second stage of analog LDO branch 303*b* may further down-convert the 1.3V to 1V, as needed for the load 315. In this example, the PCE, with power supplied by the analog branch combined by 303*a* and 303*b*, may be $1/1.8$=55.56%.

In both FIGS. 3A and 3B, the voltage of the second rail 312 may have a relatively close value to the load voltage or $V_{out}$, for example, 1V in this example. If the PCE of the hybrid LDO with power supplied solely by the digital LDO branch 309 and the voltage of the second rail 312 is 1.05V as an example, the PCE may be $1/1.05$=95.24%, which may be the highest efficiency the hybrid LDO 300 can achieve.

In some embodiments, to achieve high PSRR and PCE at the same time, both the analog LDO branch 303*a/b* and digital LDO branch 309 with dual rails ($V_{AA}$ and $V_{DD}$) may be operating simultaneously. As a boundary condition, if the second stage of the analog LDO branch 303*b* is designed to cancel or reduce ripple current similarly to the ripple fluctuation 218, based on FIG. 3B, the PCE of the hybrid LDO 305 can be derived as shown in equation 1:

$$PCE = \frac{\frac{1}{2} \times \frac{V_{DD,ripple}}{V_{DD} - V_{out}} + 1}{\frac{1}{2} \times \frac{V_{DD,ripple}}{V_{DD} - V_{out}} \times V_{AA} + V_{DD}} \quad \text{(equation 1)}$$

wherein, $V_{AA}$ is the voltage of the first rail coupled to the analog branch 303*a*/303*b*, VDD is the voltage of the second rail coupled to the digital LDO branch 309, $V_{out}$ is the load voltage at node 327 provided to the load 315, $V_{DD,\ ripple}$ is the ripple noise of $V_{DD}$. In an example of the hybrid LDO with $V_{AA}$ equal to 1.8V, $V_{DD}$ equal to 1.05V, $V_{out}$ is 1V, and $V_{DD,\ ripple}$ is 0.005V, a PCE of 92.11% can be achieve using both the analog branch and digital branch with high PSRR. Such a PCE is much higher than sole analog LDO realization, which is 55.56% under the same setting.

$PSRR_D$ may be defined as PSRR performance mainly considering the noise introduced by the $V_{DD}$ rail but not the noise from $V_{AA}$ rail. Thus, $$PSRR_D = \frac{V_{out,ripple}}{V_{DD,ripple}}.$$

In contrast, $PSRR_A$ may be defined as PSRR performance mainly considering the noise introduced by the $V_{AA}$ rail but not the noise from $V_{DD}$ rail. Thus, $$PSRR_A = \frac{V_{out,ripple}}{V_{AA,ripple}}.$$

The overall PSRR performance of the hybrid LDO may be bottlenecked by the worse one of the aforementioned $PSRR_A$ and $PSRR_D$. In theory, the $PSRR_A$ may always be much better than $PSRR_D$ due to the high loop gain of the analog error amplifier. Therefore, $PSRR_D$ may be considered and analyzed for improving the overall PSRR performance as follows.

As discussed earlier, if only the digital branch is used to provide power supply to the load 315, an undesirable ripple fluctuation or noise may be injected by the digital LDO branch 309 because of the noisy VDD and/or the natural high-frequency noise from a digital LDO. The hybrid LDO 300 may improve or reduce the amount of ripple voltage $V_{DD,\ ripple}$ or current $I_{DD,\ ripple}$ 321 by using the analog LDO to cancel out the ripple voltage $V_{DD,\ ripple}$ or current $I_{DD,\ ripple}$ 321. Since the analog LDO branch **303*a*/303*b* is coupled to a different rail from the digital LDO branch 309, the second stage of analog LDO branch 303*b* may mimic the ripple voltage $V_{DD,\ ripple}$ or current $I_{DD,\ ripple}$ 321 and provide an inverse match or a complementary voltage and/current, which may provide an opposite ripple voltage $V_{AA,\ ripple}$ or current $I_{AA,\ ripple}$ 324 to the ripple voltage $V_{DD,\ ripple}$ or current $I_{DD,\ ripple}$ 321. The ripple voltage $V_{AA,\ ripple}$ or current $I_{AA,\ ripple}$ 324 may be arranged to have the same or substantially the same amplitude of the ripple voltage $V_{DD,\ ripple}$ or current $I_{DD,\ ripple}$ 321** and be in an opposite phase.

In some embodiments, the ripple fluctuation introduced by $V_{DD}$ may be suppressed by the complementary opposite voltage or current $V_{AA,\ ripple}$ or current $I_{AA,\ ripple}$ 324 at the output node 327. A much smaller ripple voltage or current at the load 309, may be achieved, which is shown as $V_{out,\ ripple}$ or current $V_{out,\ ripple}$ 330. In this way, the second stage of analog LDO branch **303*b* may treat the ripple voltage $V_{DD,\ ripple}$ or current $I_{DD,\ ripple}$ 321** as an equivalent load perturbation. Thus, the hybrid LDO may achieve a PSRR as shown in equation 2:

$$PSRR_D = \frac{V_{out,ripple}}{V_{DD,ripple}} = \frac{1}{R_D\left(\frac{1}{R_L} + \beta \times g_{mp}(s) \times A_{EA}(s)\right) + 1} \quad \text{(equation 2)}$$

wherein, RD is the digital branch's turn-on resistance, $R_L$ is the load resistance, β is the resistor feedback factor, $g_{mp}(s)$ is the transconductance of the power PMOS of the analog LDO, and $A_{EA}(s)$ is the voltage gain of the error amplifier in the analog LDO of the second stage of the analog LDO branch **303*b* (which are not shown in FIG. 3B). This hybrid LDO 300 can achieve −30 dB PSRR up to 10 MHz by utilizing the second stage of analog LDO branch 303*b* to cancel the ripple voltage $V_{DD,\ ripple}$ or current $I_{DD,\ ripple}$ 321. Note that equation 2 may also apply to the hybrid LDO 300 of FIG. 3**A.

In some embodiments, the noise caused by the digital LDO branch 309 itself may be considered as well. The second stage of analog LDO branch **303*b* may provide the complementary voltage or current to cancel the total ripple/noise effect introduced by both $V_{DD}$ and the digital LDO branch 309**.

In some embodiments, the analog LDO branch 303 in FIG. 3A may provide the same or substantially similar complementary voltage or current as the second stage of analog LDO branch **303*b* does in FIG. 3**B.

Figure 4A:
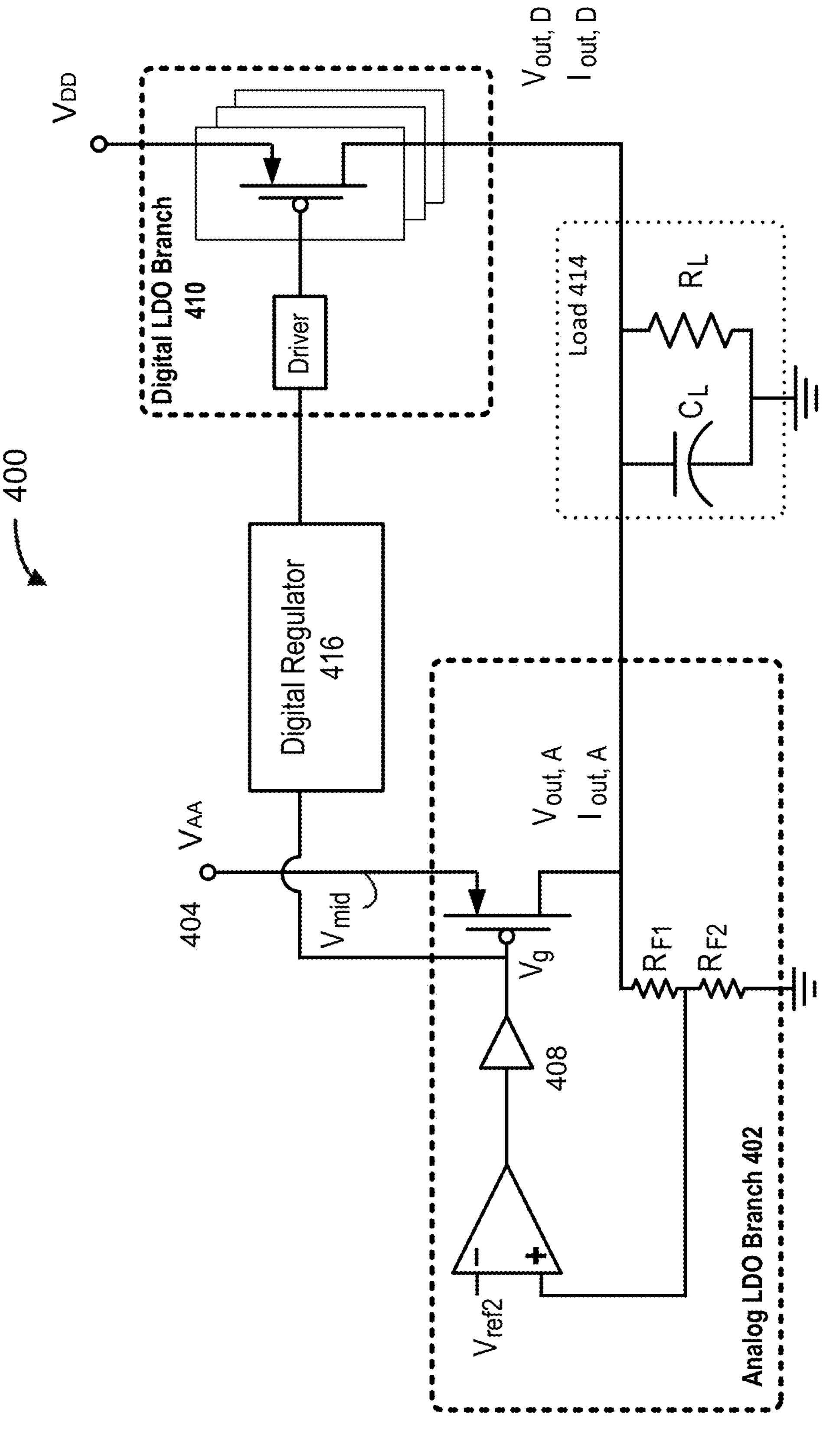
FIG. 4A illustrates a schematic topology of a simplified hybrid LDO of FIG. 3A in accordance with various embodiments.

FIG. 4A illustrates a schematic topology of a simplified hybrid LDO 400 (hereinafter "hybrid LDO 400") of FIG. 3A in accordance with various embodiments. One analog LDO branch and one digital LDO branch may be used in this example hybrid LDO 400. A analog LDO branch 402 may be coupled to a first rail 404 to receive input power supply. The voltage of the first rail 404 is $V_{AA}$. The analog LDO branch 402 may be the same or substantially similar to the analog LDO 100 and the analog LDO branch 303.

The analog LDO branch 402 may have an internal dominant pole architecture with a voltage buffer 408. Such an architecture may improve LDO performance over a wide dynamic range of load resistance, which is one of the challenges in LDO implementation. For example, the digital LDO branch 410 may contribute further resistance variation due to a dynamic load resistance $R_L$. In an example, a total ~−30 dB PSRR may be achieved by using the analog LDO branch 402.

While the digital LDO branch 410 is coupled to the load 414 and provides load current $I_{out,\ D}$ jointly, corresponding LDO regulations may consider any interactions between the two LDOs. Otherwise, regulation competition and/or oscillation may occur between the analog LDO branch 402 and the digital LDO branch 410. In one example, a digital regulator 416 may be coupled to both the analog LDO branch 402 and the digital LDO branch 410 to provide digital control to the digital LDO branch 410, which may indirectly control the second stage of the analog LDO branch 402 as well through the control over the digital LDO branch 410. A detailed schematic architecture of the digital regulator 416 is discussed in FIG. 5A.

In the scheme of LDO regulations, the analog LDO branch 402 may have a ultrafast regulation at a rate up to several hundreds of MHz, whereas the digital LDO branch 410 may have a regulation corresponding to the DC component of the load current $I_{out,\ D}$. The digital regulator 416 may then detect or receive the gate voltage $V_g$ of the analog LDO branch 402 and use $V_g$, as an indicator of $V_{out,\ A}$ or $V_{out,\ D}$, in determining a value of a control signal to control the digital LDO branch 410. There may be benefits in using $V_g$ rather than $V_{out}$ in such a determination of the control signal. For example, $V_g$ is an amplified voltage that is corresponding to $V_{out}$, so it is much easier to detect small perturbation compared to detecting $V_{out}$ directly. When the ripple fluctuation in $V_{out}$ is not sufficiently large to be detectable for the digital regulator 416, additional amplifier may be needed to detect such ripple fluctuation. Otherwise, the sensitivity of detecting perturbation in $V_{out}$ may be poor. Further, $V_g$ may have necessary information related to the analog loop of the analog LDO branch 402. The information may be needed to correlate the operations of the analog LDO branch 402 and the digital LDO branch 410.

Figure 4B:
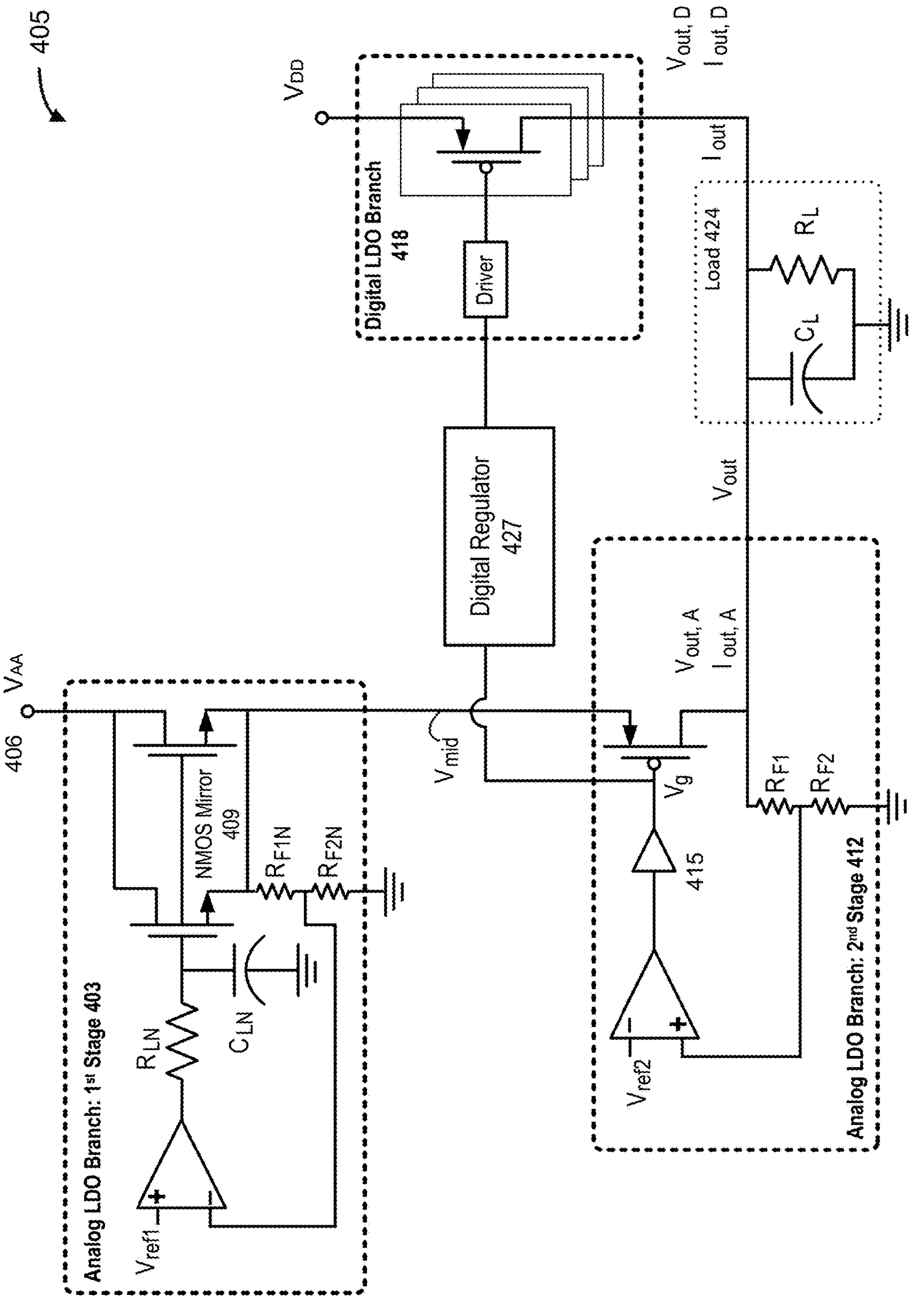
FIG. 4B illustrates a schematic topology of a simplified hybrid LDO of FIG. 3B in accordance with various embodiments.

FIG. 4B illustrates a schematic topology of a simplified hybrid LDO 405 (hereinafter "hybrid LDO 405") of FIG. 3B in accordance with various embodiments. Two stages of analog LDO branch are used in this example hybrid LDO 405. A first stage of the analog LDO branch 403 may be coupled to a first rail 406 to receive input power supply. The voltage of the first rail 406 is $V_{AA}$. The first stage of the analog LDO branch 403 may be the same or substantially similar to the analog LDO 100 and the first stage of the analog LDO branch 303*a*. To ensure adequate bandwidth and power consumption, large passive components (e.g., on-chip capacitors) are mandatory.

Alternatively and additionally, the first stage of the analog LDO branch 403 may include an NMOS mirror 409 to save silicon area by mapping corresponding current, capacitance, and resistance (e.g., $C_{LN}$, $R_{F1N}$, $R_{F2N}$, etc.) to smaller values. A 1:100 ratio may be used in such an application. According to the example in FIG. 3B, if a 1.8 V is used by the first rail to provide input power to the first stage of the analog LDO branch 403, a 1.3 V output voltage of the first stage of the analog LDO branch 403 may be designed such that the 1.3 V voltage is fed into the second stage of the analog LDO branch 412. Thus, the input voltage of the second stage of the analog LDO branch 412 is $V_{mid}$. In an example, the first stage of the analog LDO branch 403 may provide certain high PSRR (e.g., ~20 dB) contributing an overall PSRR of the analog branch of both the first and second stages of the analog LDOs.

The second stage of the analog LDO branch 412 may be the same as or substantially similar to the analog LDO 100 and the second stage of the analog LDO branch 303*b*. In one example, the second stage of the analog LDO branch 412 may have an internal dominant pole architecture with a voltage buffer 415. Such an architecture may improve LDO performance over a wide dynamic range of load resistance, which is one of the challenges in LDO implementation. For example, the digital LDO branch 418 may contribute further resistance variation due to a dynamic load resistance $R_L$. In an example, a total ~30 dB PSRR may be achieved by using the two stages. A corresponding 30 dB loop gain at 10 MHz of the second stage of the analog LDO branch 412 may be derived based on practice estimation. This may result a minimum unity gain frequency (UGF) of 320 MHz, which is hardly achievable for any conventional analog LDO or digital LDO used alone. In the two-staged analog LDO branch, the gate capacitance of the power PMOS of the second stage of the analog LDO branch 412 may load the error amplifier 421 of the second stage of the analog LDO branch 412. In an example for high-speed application, the voltage buffer 415 may reduce parasitic capacitance and achieve an UGF of above 400 MHz.

While the digital LDO branch 418 and the second stage of the analog LDO branch 412 are respectively coupled to the load 424 and provide load current $I_{out}$ jointly, corresponding LDO regulations may consider any interactions among the multiple LDOs. Otherwise, regulation competition and/or oscillation may occur between the second stage of the analog LDO branch 412 and the digital LDO branch 418. In one example, a digital regulator 427 may be coupled to both the second stage of the analog LDO branch 412 and the digital LDO branch 418 to provide digital control to the digital LDO branch 418, which may indirectly control the second stage of the analog LDO branch 412 as well through the control over the digital LDO branch 418. A detailed schematic architecture of the digital regulator 427 is discussed in FIG. 5.

In the scheme of LDO regulations, the second stage of the analog LDO branch 412 may have a ultrafast regulation at a rate up to several hundreds of MHz, whereas the digital LDO branch 418 may have a regulation corresponding to the DC component of the load current $I_{out,\ D}$. The digital regulator 427 may then detect or receive the gate voltage $V_g$ of the second stage of the analog LDO branch 412 and use $V_g$, as an indicator of $V_{out,\ A}$ or $V_{out,\ D}$, in determining a value of a control signal to control the digital LDO branch 418. There may be benefits in using $V_g$ rather than $V_{out,\ A}$ or $V_{out,\ D}$ in such a determination of the control signal. For example, $V_g$ is an amplified voltage that is corresponding to $V_{out,\ A}$ or $V_{out,\ D}$, so it is much easier to detect small perturbation compared to detecting $V_{out,\ A}$ or $V_{out,\ D}$ directly. When the ripple fluctuation in $V_{out,\ A}$ or $V_{out,\ D}$ is not sufficiently large to be detectable for the digital regulator 427, an additional amplifier may be needed to detect such ripple fluctuation. Otherwise, the sensitivity of detecting perturbation in $V_{out,\ A}$ or $V_{out,\ D}$ may be poor.

Further, $V_g$ may have necessary information related to the analog loop of the second stage of the analog LDO branch 412. The information may be needed to correlate the operations of the second stage of the analog LDO branch 412 and the digital LDO branch 418. Noted that $V_{out,A}$ or $V_{out,D}$ may refer to $V_{out}$, since $V_{out,\ A}$ and $V_{out,\ D}$ may be connected or coupled to the same node of load.

Figure 5A:
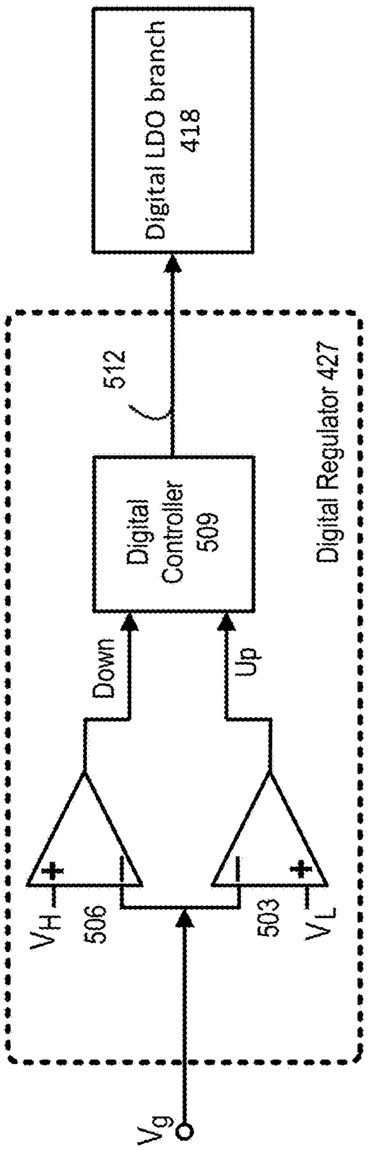
FIG. 5A further illustrates a schematic architecture of a simplified digital regulator in accordance with an example digital regulator and some other embodiments.

FIG. 5A further illustrates a schematic architecture of a simplified digital regulator in accordance with the digital regulator 427 and some other embodiments. The digital regulator 427 may include at least two comparators 503 and 506. In accordance with FIG. 4, the digital regulator 427 may receive or detect the gate voltage of the second stage of the analog LDO branch 412, $V_g$, to compare it with two reference values. The comparator 503 may be used to compare $V_g$ to a low reference $V_L$. The low reference $V_L$ may indicate a lower bound voltage reference. The comparator 506 may be used to compare $V_g$ to a high reference $V_H$. The high reference $V_H$ may indicate an upper bound voltage reference. If $V_g$ is within the range of $V_L$ and $V_H$, the digital regulator 427 may maintain the status of the digital LDO branch 418. Otherwise, if $V_g$ is smaller than $V_L$, the comparator 503 may be triggered to send an "up" signal to a digital controller 509. Then, the digital controller 509 may generate a control signal 512, which may indicate to switch on additional one or more power transistors of the array of power transistors of the digital LDO branch 418. The control signal 512 may include a sequence of bits to control a shift register (not shown) in the digital LDO branch 418. For example, an 8-bit control signal may be used to provide 256 values of the control signal corresponding to 256 amounts of current that may be provided by the digital LDO branch 418.

In another case scenario, if $V_g$ is greater than $V_H$, the comparator 506 may be triggered to send a "down" signal to the digital controller 509. Then, the digital controller 509 may generate the control signal 512, which may indicate to switch off additional one or more power transistors of the array of power transistors of the digital LDO branch 418. The "up" and "down" signals may change one digit of the sequence of bits at one comparison. A control process may take one or more rounds of comparison.

The control process as above discussed may be of a hysteretic regulation scheme. The "up" signal may indicate that the load current from the second stage of the analog LDO branch 412 is close to saturating the capability of the second stage of the analog LDO branch 412, thus the digital regulator 427 may determine to turn on more power transistors in the digital LDO branch 418 instead. The "down"

signal may indicate, on the other hand, the load current from the second stage of the analog LDO branch 412 is close to a minimum current capability of the analog branch, and more current from the analog LDO branch may be required. By this signal, one or more power transistors in the array of the power transistors of the digital LDO branch 418 may be turned off. Therefore, a ratio of the load current from the analog LDO branch to the digital LDO branch may be programmed or determined by configuring corresponding $V_L$ and $V_H$. Such a ratio may also determine or indicate a tradeoff between the desired PSRR and PCE.

A programmable current steering ratio (CSR) may then indicate the portions of DC current for the load 424 provided by the digital LDO branch 418 and by the analog LDO branch including the first and second stages of the analog LDO branch 412 and 403. The programmable CSR may optimize the PSRR and PCE of the hybrid LDO 400 based on each workload.

According to either FIG. 4A or 4B, the low reference VL may be determined by the amount of analog LDO output current $I_{out,A}$ to achieve a needed maximum PSRR ($PSRR_{D,max}$). As discussed earlier in FIG. 4B, $V_{mid}$ is the input voltage for the second stage of the analog LDO branch 412. $g_{mp}$ is a transconductance of at least one power transistor that is used by the second stage of the analog LDO branch 412. With Shichman-Hodges MOS model, the transconductance can be analyzed as $g_{mp}=2\times I_{out,A}/(V_{gs}-V_{th})$, where $V_{gs}$ is the gate-to-source voltage of the power PMOS and equal to $V_{mid}-V_g$ in the second stage of the analog LDO branch 412, $V_{th}$ is the threshold voltage of the power transistor, $R_L$ is the load resistance, $A_{EA,\ DC}$ is the voltage gain of the error amplifier regarding a DC component of the signal, β is the resistor feedback factor, $V_{DD}$ is an input voltage of the digital LDO branch 418, $V_{OUT}$ is an output voltage at the load node, $I_{out,A}$ is an output current provided by the analog LDO branch to the load, and $I_{out}$ is an output current to provide current to the load. Therefore, the low reference may be correlated with the needed maximum $PSRR_{D,max}$, and analog LDO output current $I_{out,A}$. As a general tradeoff, the more $I_{out,A}$ contribution to the total output current $I_{out}$, the better PSRR but less PCE. Further, the low reference $V_L$ may be determined based on equation 3:

$$V_L = V_{mid} - V_{th} - \beta \times \frac{I_{out,A}}{\dfrac{\frac{1}{PSRR_{D,max}} - 1}{\frac{V_{DD} - V_{OUT}}{I_{out} - I_{out,A}}} - \dfrac{1}{R_L}} \times A_{EA,DC} \quad \text{(equation 3)}$$

Therefore, if $V_g<V_L$, it means that the analog LDO may supply sufficient current $I_{out,A}$ to achieve target PSRR and at least one unit current supply could be steered from $I_{out,A}$ to the digital LDO contribution $I_{out,D}$ by turning on one more unit power transistors in the digital LDO. The unit current supply by a unit power transistor refers to an amount of current supply provided by the digital LDO branch 418 to the load 424, and the amount corresponds to a unit amount that is provided by a single unit power transistor of the array of power transistors. The single unit power transistor is one or more transistors that may be switched on or off by a single digit change in the control signal 512. In an example of an 8-bit control signal, there may be 256 control values, thus, 255 units of the array of power transistors. One unit power transistor may include one or more power transistors.

The high reference $V_H$ may be determined by the amount of analog LDO output current $I_{out,A}$ to achieve the needed minimum PSRR ($PSRR_{D,min}$). If more power transistors of the digital LDO branch 418 are to be switched on, less-than-ideal analog LDO current $I_{out,A}$ and PSRR may be anticipated. Thus, $V_H$ may correspond to an upper limit in which a minimum $I_{out,A}$ and maximum amount of power transistors of the digital LDO branch 418 (or a maximum ratio for load current from the digital branch LDO 418) may be used to meet the specified minimum PSRR requirement. Further, the high reference $V_H$ may be determined according to equation 4:

$$V_H = V_{mid} - V_{th} - \beta \times \frac{I_{out,A}}{\dfrac{\frac{1}{PSRR_{D,min}} - 1}{\frac{V_{DD} - V_{OUT}}{I_{out} - I_{out,A}}} - \dfrac{1}{R_L}} \times A_{EA,DC} \quad \text{(equation 4)}$$

Similarly to equation 3, $V_{mid}$ is the input voltage for the second stage of the analog LDO branch, $V_{th}$ is the threshold voltage of the power transistor, β is the resistor feedback factor, $R_L$ is the load resistance, $A_{EA,\ DC}$ is the voltage gain of the error amplifier regarding a DC component of the signal, $V_{DD}$ is an input voltage of the digital LDO, $V_{OUT}$ is an output voltage at the load node, $I_{out,A}$ is an output current provided by the analog LDO branch to the load, and $I_{out}$ is an output current to provide current to the load. Therefore, the high reference may be correlated with a needed minimum $PSRR_{D,min}$, and analog LDO output current $I_{out,A}$. If larger digital portion is used in providing load current, a compromised PSRR may result, even though high PCE may be achieved. At this situation, at least one unit current may be steered from $I_{out,D}$ to analog LDO contribution $I_{out,A}$ by turning off at least one unit transistor in the digital LDO.

The above-discussed references $V_L$ and $V_H$ may apply to various embodiments based on the architecture of FIG. 3A and 4A. Noted that in a hybrid LDO with single-staged analog LDO architecture, $V_{mid}$ may refer to an input voltage of the analog LDO.

Figure 5B:
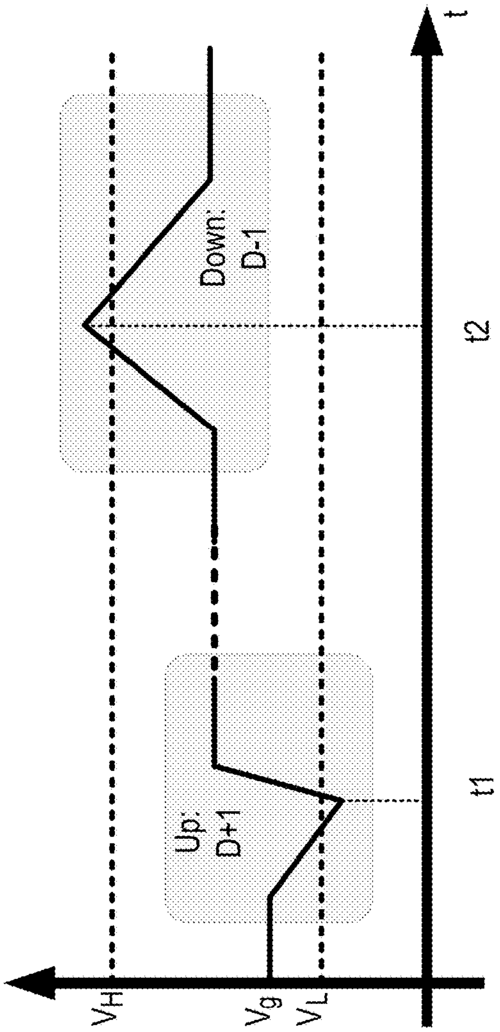
FIG. 5B illustrates an example control process of the digital LDO according to the digital regulator and some embodiments.

FIG. 5B illustrates an example control process of the digital LDO branch 418 according to the digital regulator 427 and some embodiments. In this example, the initial $V_g$ is within the range of $V_L$–$V_H$. Then, at $t_1$, the detected $V_g$ has dropped below $V_L$ due to load resistance change or any ripple noise changes introduced in the digital LDO branch 418, or a combination thereof. The comparator 503 of the digital regulator 427 may be triggered to send the "up" signal to the digital controller 509 so that the digital controller may increase (or decrease, depending on the control mechanism of the S/P of the digital LDO branch 418) a digit in the value of the control signal, wherein the value of the control signal may correspond to a sequence of bits. This new value of the control signal may indicate to switch on one additional unit power transistor of the array of power transistors of the digital LDO branch 418. As a result, $V_g$ has been brought back within the range of $V_L$–$V_H$.

In another event, at $t_2$, detected $V_g$ has increased above $V_H$ due to load resistance change or any ripple noise changes introduced in the digital LDO branch 418, or a combination thereof. The comparator 506 of the digital regulator 427 may be triggered to send the "down" signal to the digital controller 509 so that the digital controller may decrease (or increase, depending on the control mechanism of the S/P of the digital LDO branch 418) a digit in the value of the control signal, wherein the value of the control signal may correspond to a sequence of bits. This new value of the control signal may indicate to switch off one additional unit power transistor of the array of power transistors of the digital LDO branch 418. As a result, $V_g$ has been brought back with the range of $V_L$–$V_H$. In some examples, more than one digit change may be needed to bring the $V_g$ back to the range of $V_L$–$V_H$.

Figure 6:
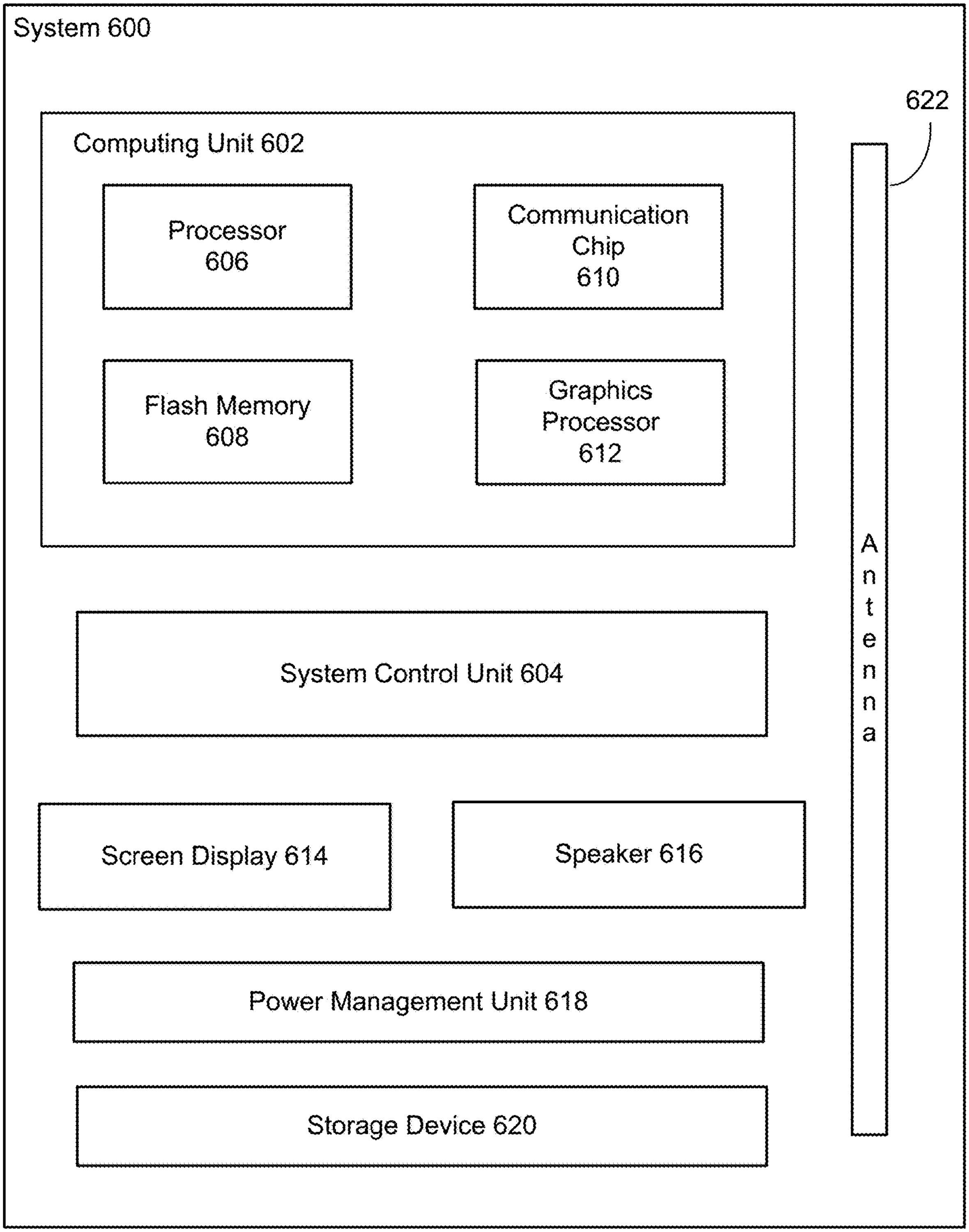
FIG. 6 illustrates an example system that may employ the apparatuses and/or methods described herein, in accordance with various embodiments.

FIG. 6 illustrates an example system 600 that may employ the apparatuses and/or methods described herein (e.g., hybrid LDOs 300, 305, 400, digital regulator 427, etc.), in accordance with various embodiments. In some embodiments, the system 600 may be part of or implemented by an SOC. As shown, the system 600 may include a computing unit 602, a system control unit 604, and some other devices that affiliate with the system 600. The computing unit 602 may include one or more processor(s) 606 (one shown). In various embodiments, the one or more power management units 618 may be the same as or substantially similar to or include the hybrid LDOs 300, 305, 400. The computing unit 602 may include a flash memory 608. In various embodiments, at least one communication chip 610 may be physically and electrically coupled to the one or more processor(s) 606. In further implementations, the communication chip 610 may be part of the one or more processor(s) 606. A graphics processor 612 may be physically and electrically coupled to the one or more processor(s) 606. In further implementations, the graphics processor 612 may be part of the one or more processor(s) 606.

In various embodiments, the power management unit 618 may provide the first rail and the second rail with different voltages to the hybrid LDO. The first rail and the second rail may be respectively coupled to the analog LDO branch and the digital LDO branch to provide input power for the hybrid LDO.

In various embodiments, the system control unit 604 may monitor and control individual components in the system 600. These components include, but are not limited to, the computing unit 602, a screen display 614 (e.g., a non-touchscreen display or touchscreen display), a speaker 616, a power management unit 618, a storage device 620 (e.g., a hard-disk drive (HDD)), one or more antenna(s) 622, a digital signal processor (not shown), a crypto processor (not shown), a display (not shown), a battery (not shown), an audio codec (not shown), a video codec (not shown), a global positioning system (GPS) device (not shown), a compass (not shown), an accelerometer (not shown), a gyroscope (not shown), a camera (not shown), and a mass storage device (such as a hard disk drive, solid state drive, compact disk (CD), digital versatile disk (DVD)) (not shown), engine of an automotive system (not shown) and so forth. In various embodiments, the processor 606 may be integrated on the same die with other components to form an SOC.

In various embodiments, the system 600 may include a printed circuit board (PCB). For these embodiments, the system control unit 604, flash memory 608, communication chip 610, graphics processor 612, and power management unit 618 may be disposed thereon. In alternate embodiments, the various components may be coupled without the employment of the PCB.

In various embodiments, the system 600 may be implemented as part of or by medical diagnostic, operational, or other related instruments.

Various simulations and prototype work with respect to dual-rail hybrid LDO have been conducted. Results have shown significant performance improvements. In one experiment of hybrid LDO with various combinations of load current and operation, PCE has been significantly better than typical conventional analog LDOs, and PSRR can be improved by up to 40 dB compared to conventional digital LDOs. Other major parameters have also been improved significantly.

Some non-limiting Examples of various embodiments are provided below.

Example 1 is an apparatus of a hybrid linear dropout regulator (LDO) comprising: a digital LDO that is coupled to a load of an integrated circuit (IC) at an output node, the digital LDO to provide an output voltage at the output node to supply power to the load; and an analog LDO that is coupled to the output node in parallel with the digital LDO, the analog LDO to provide a complementary voltage to the output node based on a noise in the output voltage; and wherein the digital LDO is coupled to a first rail to receive a first voltage and the analog LDO is coupled to a second rail to receive a second voltage, and the first rail is different from the second rail.

Example 2 is the apparatus of example 1 and/or some other examples herein, further comprising a digital regulator that is coupled to the analog LDO and the digital LDO to receive a gate voltage of the analog LDO; and generate a control signal to control the digital LDO, based on the gate voltage of the analog LDO.

Example 3 is the apparatus of example 2 and/or some other examples herein, wherein the digital regulator is further to determine a value of the control signal based on respective comparisons of the gate voltage to a low reference and a high reference, wherein the low reference is smaller than the high reference.

Example 4 is the apparatus of example 3 and/or some other examples herein, wherein the value of the control signal is a value of a sequence of bits based on which the digital LDO is operable to switch on at least one power transistor of an array of power transistors of the digital LDO, and the array of power transistors is arranged to provide a current supply to the load.

Example 5 is the apparatus of example 4 and/or some other examples herein, wherein the low reference is a voltage reference $V_L$, and a difference between the second voltage and the voltage reference $V_L$ corresponds to a unit current supply that is provided by one unit power transistor of the array of power transistors of the digital LDO, wherein the one unit power transistor is controlled by one smallest bit of the sequence of bits.

Example 6 is the apparatus of example 5 and/or some other examples herein, wherein the high reference is a voltage reference $V_H$, and a difference between the second voltage and the voltage reference $V_H$ corresponds to a satisfaction of a target power supply rejection ration (PSRR) of the output voltage.

Example 7 is the apparatus of example 6 and/or some other examples herein, wherein the satisfaction of the target PSRR is based on a calculation in accordance with $(V_{AA}-V_H)\times g_{mp}$, wherein, $V_{AA}$ is the second voltage and $g_{mp}$ is a transconductance of at least one power transistor of the analog LDO.

Example 8 is the apparatus of example 3 and/or some other examples herein, wherein the digital regulator includes at least two comparators to compare the gate voltage respectively with the high reference and the low reference.

Example 9 is the apparatus of example 8 and/or some other examples herein, wherein the digital regulator is to determine the value of the control signal to increase a current supply to the load from the digital LDO if the gate voltage is smaller than the low reference.

Example 10 is the apparatus of example 8 and/or some other examples herein, further comprising a digital controller is to determine the value of the control signal to decrease a current supply to the load from the digital LDO if the gate voltage is greater than the high reference.

Example 11 is the apparatus of example 8 and/or some other examples herein, further comprising a digital controller is to determine the value of the control signal to maintain an existing current supply to the load from the digital LDO if the gate voltage is greater than the low reference and smaller than the high reference.

Example 12 is the apparatus of example 1 and/or some other examples herein, further comprising one or more additional analog LDOs coupled in series with the analog LDO and the first rail.

Example 13 is the apparatus of example 1 and/or some other examples herein, further comprising at least one analog LDO coupled to the digital LDO in parallel and a third rail of a third voltage.

Example 14 is the apparatus of example 1 and/or some other examples herein, wherein the first voltage is different from the second voltage.

Example 15 is the apparatus of example 1 and/or some other examples herein, wherein the digital LDO and the analog LDO include p-type devices.

Example 16 is a system of a hybrid LDO, comprising: a first set of digital devices that is to provide a first portion of power to a load, the first set of digital devices are to be controlled by a digital regulator; and a second set of analog devices that provides a second portion of power to the load; and wherein the second set of analog devices is set to reduce noise in the first portion of power to the load and the system is coupled to the load to provide the first portion of power and second portion of power to the load.

Example 17 is the system of example 16 and/or some other examples herein, wherein the first set of digital devices is coupled to a first rail to receive a first voltage and the second set of analog devices is coupled to a second rail to receive a second voltage that is different from the first voltage.

Example 18 is the system of example 16 and/or some other examples herein, wherein the digital regulator is to: receive a gate voltage of the second set of analog devices; compare the gate voltage to a low reference and high reference respectively; and generate a control signal to control a shift register of the first set of digital devices, based on the respective comparisons of the gate voltage.

Example 19 is the system of example 18 and/or some other examples herein, wherein the digital regulator is further to generate an up signal to indicate to switch on additional one or more power transistors of an array of the power transistors if the gate voltage is smaller than the low reference.

Example 20 is the system of example 18 and/or some other examples herein, wherein the digital regulator is further to generate a down signal to indicate to switch off additional one or more power transistors of an array of the power transistors if the gate voltage is greater than the high reference.

Example 21 is the system of example 16 and/or some other examples herein, wherein the noise includes a ripple fluctuation introduced by a first rail.

Example 22 is the system of example 21 and/or some other examples herein, wherein the noise includes high-frequency noise introduced by the first set of digital devices.

Example 23 is the system of example 16 and/or some other examples herein, further comprising a third set of analog devices that is coupled to an input node of the second set of analog devices, wherein the third set of analog devices is to provide an input power to the second set of the analog devices.

Example 24 is the system of examples 18 and 23 and/or some other examples herein, wherein the low reference is configured based on an equation of $$V_L = V_{mid} - V_{th} - \beta \times \frac{I_{out,A}}{\frac{\frac{1}{PSRR_{D,max}} - 1}{\frac{V_{DD} - V_{OUT}}{I_{out} - I_{out,A}}} - \frac{1}{R_L}} \times A_{EA,DC}$$

which is determined by a needed maximum PSRR target and analog LDO output current, wherein, $V_{mid}$ is the voltage at the input node and $g_{mp}$ is a transconductance of at least one power transistor of the second set of analog devices.

Example 25 is the system of examples 18 and 23 and/or some other examples herein, wherein the high reference is configured based on that a current provided according to $$V_H = V_{mid} - V_{th} - \beta \times \frac{I_{out,A}}{\frac{\frac{1}{PSRR_{D,min}} - 1}{\frac{V_{DD} - V_{OUT}}{I_{out} - I_{out,A}}} - \frac{1}{R_L}} \times A_{EA,DC}$$

satisfies a target power supply rejection ration (PSRR) of the hybrid LDO or the second set of analog devices.

Example 26 is the system of examples 18 and 25 and/or some other examples herein, wherein the high reference is configured to satisfy a target power supply rejection ration (PSRR) of the hybrid LDO or the second set of analog devices if the gate voltage of the second set of analog devices equals the high reference $V_H$.

Example 27 is an apparatus of a digital regulator comprising: at least two comparators to compare a gate voltage of an analog LDO to a low reference and a high reference; and a digital controller to generate a control signal to control a shift register of a digital LDO, based on respective comparisons by the at least two comparators; and wherein respective outputs of the at least two comparators are coupled to corresponding inputs of the digital controller to determine a value of the control signal based on the respective comparisons by the at least two comparators.

Example 28 is the apparatus of example 27 and/or some other examples herein, wherein the digital LDO is coupled to a load circuitry at an output node, to provide a current supply to the load circuitry at the output node; and the analog LDO is coupled to the load circuitry at the output node in parallel with the digital LDO, to detect a ripple fluctuation in the current supply and provide a complementary current to the output node that is in an opposite phase with the ripple fluctuation; wherein the digital regulator is coupled to the analog LDO to receive the gate voltage and coupled to the digital analog LDO to control an operation of the digital LDO.

Example 29 is the apparatus of example 27 and/or some other examples herein, wherein a determination of the low reference and high reference corresponds to an input voltage that provides input power to the analog LDO.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

The present disclosure is described with reference to flowchart illustrations or block diagrams of methods, apparatuses (systems), and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A voltage regulator circuit, comprising:
- a first set of digital devices that is to provide a first portion of current to a load;
- a second set of analog devices that is to provide a second portion of current to the load, wherein the second set of analog devices is to reduce noise in the first portion of current to the load; and
- a digital regulator to control the first set of digital devices, wherein the digital regulator is to:
  - receive a gate voltage of the second set of analog devices;
  - compare the gate voltage to a low reference and a high reference, respectively, wherein the low reference is smaller than the high reference, and wherein the low reference is based at least in part on an input voltage of the second set of analog devices and a maximum value of a target power supply rejection ratio (PSRR) of an output voltage to be provided to the load; and
  - generate a control signal to control a shift register of the first set of digital devices based on the respective comparisons of the gate voltage, wherein the shift register is to control respective power transistors of the first set of digital devices to be on or off.

2. The circuit of claim 1, wherein the first set of digital devices is coupled to a first rail to receive a first voltage and the second set of analog devices is coupled to a second rail to receive a second voltage that is different from the first voltage.

3. The circuit of claim 1, wherein the high reference is based at least in part on the input voltage of the second set of analog devices and a minimum value of the target PSRR of the output voltage to be provided to the load.

4. The circuit of claim 1, wherein the digital regulator is to:
- determine the value of the control signal to increase the first portion of current if the gate voltage is smaller than the low reference; and
- determine the value of the control signal to decrease the first portion of current if the gate voltage is greater than the high reference.

5. The circuit of claim 4, wherein the digital controller is further to determine the value of the control signal to maintain a value of the first portion of current if the gate voltage is greater than the low reference and smaller than the high reference.

6. The circuit of claim 1, wherein the first set of digital devices includes one or more digitally controlled transistors and second set of analog devices includes one or more analog-controlled transistors.

7. The circuit of claim 1, wherein the noise includes a ripple fluctuation introduced by a first rail.

8. The circuit of claim 7, wherein the noise further includes a high-frequency noise introduced by the first set of digital devices.

9. A computer system comprising:
- a load including one or more processors; and
- a voltage regulator to provide a regulated output voltage to the load, wherein the voltage regulator includes:
  - a first set of digital devices that is to provide a first portion of current to the load;
  - a second set of analog devices that is to provide a second portion of current to the load, wherein the second set of analog devices is to reduce noise in the first portion of current to the load; and
  - a digital regulator to control the first set of digital devices, wherein the digital regulator is to:
  - receive a gate voltage of the second set of analog devices;
  - compare the gate voltage to a low reference and a high reference, respectively, wherein the low reference is smaller than the high reference, and wherein the low reference is based at least in part on an input voltage of the second set of analog devices and a maximum value of a target power supply rejection ratio (PSRR) of an output voltage to be provided to the load; and
generate a control signal to control a shift register of the first set of digital devices based on the respective comparisons of the gate voltage, wherein the shift register is to control respective power transistors of the first set of digital devices to be on or off.

10. The system of claim 9, wherein the first set of digital devices is coupled to a first rail to receive a first voltage and the second set of analog devices is coupled to a second rail to receive a second voltage that is different from the first voltage.

11. The system of claim 9, wherein the high reference is based at least in part on the input voltage of the second set of analog devices and a minimum value of the target PSRR of the output voltage to be provided to the load.

12. The system of claim 9, wherein the digital regulator is to:
determine the value of the control signal to increase the first portion of current if the gate voltage is smaller than the low reference; and
determine the value of the control signal to decrease the first portion of current if the gate voltage is greater than the high reference.

13. The system of claim 9, wherein the noise includes a ripple fluctuation introduced by a first rail, and a noise introduced by the first set of digital devices.

14. A voltage regulator circuit, comprising:
a first set of digital devices that is to provide a first portion of current to a load;
a second set of analog devices that is to provide a second portion of current to the load, wherein the second set of analog devices is to reduce noise in the first portion of current to the load; and
a digital regulator to control the first set of digital devices, wherein the digital regulator is to:
receive a gate voltage of the second set of analog devices;
compare the gate voltage to a low reference and a high reference, respectively, wherein the low reference is smaller than the high reference, and wherein the high reference is based at least in part on an input voltage of the second set of analog devices and a minimum value of a target power supply rejection ratio (PSRR) of an output voltage to be provided to the load; and
generate a control signal to control a shift register of the first set of digital devices based on the respective comparisons of the gate voltage, wherein the shift register is to control respective power transistors of the first set of digital devices to be on or off.

15. The circuit of claim 14, wherein the first set of digital devices is coupled to a first rail to receive a first voltage and the second set of analog devices is coupled to a second rail to receive a second voltage that is different from the first voltage.

16. The circuit of claim 14, wherein the digital regulator is to:
determine the value of the control signal to increase the first portion of current if the gate voltage is smaller than the low reference; and
determine the value of the control signal to decrease the first portion of current if the gate voltage is greater than the high reference.

17. The circuit of claim 16, wherein the digital controller is further to determine the value of the control signal to maintain a value of the first portion of current if the gate voltage is greater than the low reference and smaller than the high reference.

18. The circuit of claim 14, wherein the first set of digital devices includes one or more digitally controlled transistors and the second set of analog devices includes one or more analog controlled transistors.

19. The circuit of claim 14, wherein the noise includes a ripple fluctuation introduced by a first rail.

20. The circuit of claim 19, wherein the noise further includes a high-frequency noise introduced by the first set of digital devices.

* * * * *